3,161,524
CULINARY MIX CONTAINING A POLYGALACTOMANNAN
Joseph W. Opie and Ernest W. Johnson, Minneapolis, Minn., assignors to General Mills, Inc., a corporation of Delaware
No Drawing. Filed Aug. 31, 1962, Ser. No. 220,865
13 Claims. (Cl. 99—94)

The present invention relates to improved culinary mixes, and more particularly, to such mixes from which baked goods can be prepared with unexpected ease. It also relates to the process of preparing batters from said mixes and to the improved baked goods prepared from such batters.

The use of so-called "prepared mixes" for baked goods has achieved wide usage, particularly in home baking. In mixes of this type, dry ingredients, such as sugar and flour are combined in proper proportions, shortening is distributed on the blend and then the mix is packaged. In addition, baking powder, dry milk solids, salt, flavoring, dried eggs, and the like, are usually combined with the other dry ingredients in the packaged mix. Liquid materials such as water, milk and/or eggs (where the mix does not contain albumen or egg solids) are added to the mix to prepare it for use in baking.

Prepared mixes of the above-described type offer a considerable amount of convenience to the consumer in the form of a decreased amount of work required in baked goods preparation. Thus, the prepared mixes relieve the consumer of the work required in measuring and combining the portions of each ingredient needed to prepare the batter, and at the same time, they eliminate variation in the quality of the baked goods due to inaccurate weighing and measuring of the various ingredients going into the batter.

Prior art culinary mixes have not, however, overcome the problem of the excessive amount of work that is required to properly combine the aqueous liquid with the prepared mixes. Because of the larger proportion of aqueous liquid incorporated, the problem is considerably greater in the case of mixes which are used to prepare batters to be baked into cakes.

Two techniques are presently used extensively in the preparation of cake batters from prepared mixes. One of these is the "single-stage" method wherein all ingredients (mix, water and eggs) are placed in a bowl and beaten until the batter is suitably developed. Normally said mixing or beating is accomplished by using an electric mixer. The directions on one commercially available yellow cake mix prescribe a beating period of 4 minutes at medium speed on a standard mixer or at high speed on a portable mixer. In addition to the rather long beating time required, this method has the disadvantage of requiring an electric mixer which many housewives simply do not have available. Also, this technique makes it necessary to use and clean at least one mixing bowl, the beater and a spatula in addition to the regular baking pans.

The other extensively used technique is a multi-stage liquid addition method which calls for the addition of portions of the total aqueous liquid required with beating after each addition. An illustration of the problems connected with said technique is given by a typical set of instructions for the preparation of a batter from a commercially available yellow cake mix (alternative for the electric mixer technique). In the first stage of batter preparation, ¾ cup cold water and one egg are added to the mix and the batter is beaten with a spoon for about two minutes (300 strokes). These strokes are accomplished with great difficulty due to the fact that the batter, at this stage, is stiff and gummy. The second stage requires the addition of ⅓ cup cold water and one egg followed by an additional 300 strokes of beating. The beating is easier during this stage, but nevertheless requires considerable effort. The term "beating," as used above, defines an operation which is more than a simple stirring of the mixture, and when accomplished by hand, denotes a very vigorous and tiring operation.

In addition to the extensive work required in preparing batters by the multi-stage liquid addition technique, the housewife is also faced with the problem of cleaning at least one mixing bowl, a spoon and a spatula in addition to the regular baking pans. Also, because of the difficulties encountered in the initial beating of the batters, the directions given by the manufacturer for batter preparation are often not properly executed. This, of course, results in cakes of inferior quality although the mixes themselves are capable of providing a high quality cake if properly employed.

In recent years, several techniques for reducing the work required by the housewife in the preparation of batters from prepared mixes have been suggested. They involve special methods of preparing the mixes followed by single-stage liquid addition. Thus, special mix preparation is required, such as spraying atomized shortening on the other dry ingredients, or subjecting the ingredients of the mix to simultaneous shearing and crushing forces, or the use of encapsulated fats and other additives. Batters are prepared from the resulting mixes by adding all of the aqueous liquid (i.e., water, milk and/or eggs) to the mixes, followed by beating for at least about 150 strokes.

Even though the above-described methods have reduced the work required of the housewife in preparing batters from culinary mixes and aqueous liquids, room for improvement remains. Thus, said methods require 150 (and as high as 300 or more) strokes of beating. Also, the batters are prepared in bowls or other suitable containers and then transferred to baking pans. Therefore, the housewife is required to clean several pieces of mixing apparatus. Furthermore, the actual preparation of the culinary mixes by the manufacturers requires additional apparatus, such as roll mills for shearing and crushing, spray-driers, atomizers, and the like, and/or special additives.

In our copending application Serial No. 220,866, filed August 31, 1962, now abandoned, entitled Culinary Mix and Method, we disclose and claim an improved culinary mix prepared by blending flour, sugar, leavening agents, liquid shortening and an emulsifier which can be used to prepare batters in an unexpectedly easy and simple manner. Thus, all that is necessary is to place the mix in the baking pan, add aqueous liquid and then stir until smooth with a suitable stirring utensil, such as a fork or spoon. In addition to the ease of preparation of batters from these culinary mixes, they also provide the following advantages: use of conventional blending procedures for preparing the mixes; the batters can be prepared in the baking pans, thus eliminating the necessity of using mixing bowls and the like; the mixes are prepared from readily available ingredients; and the baked products prepared from the mixes have good properties, i.e., volume, shape, color, texture, grain and eating qualities.

While the invention of our copending application covers a distinct advance in the art, we have now discovered a culinary mix which has all of the advantages of that disclosed in our copending application and which, in addition, provides baked goods of improved texture and volume.

It is, therefore, an object of the present invention to provide a culinary mix of improved properties which can be used to prepare cakes, biscuits, pancakes, and the like.

Another object of the invention is to provide such a culinary mix which can be prepared from readily available ingredients using conventional techniques and apparatus and which can be used to prepare batters by merely stirring the mix and aqueous liquid with a fork or other suitable utensil.

A further object of the invention is to provide such a mix from which batters can be prepared easily in the baking pan.

Additional objects of the invention are to provide methods of preparing batters and baked goods from the mixes and to provide superior baked goods.

These and other objects will become apparent from the following detailed description.

In general, this invention comprises improved culinary mixes prepared by blending flour, sugar, leavening agents, liquid shortening, an emulsifier and a polygalactomannan. The mixes may also contain salt, flavoring agents, dried egg whites and/or yolks, lecithin, artificial coloring agents, milk solids and the like. The mixes of our invention provide baked goods of improved volume and texture.

The flour used in the preparation of our culinary mixes can be any of those customarily used in prepared mixes. Suitable sugars for use in this invention comprise any of the commonly used granular sugars, including sucrose, dextrose, maltose, fructose, lactose, and brown and invert sugars. Mixtures of one or more sugars can likewise be used. The sugars can also be used in powdered form. Preferably, a mixture of granular and powdered sucrose is employed.

The leavening agent may be any of those commonly employed in prepared mixes. Thus, sodium bicarbonate may be used in combination with various acid ingredients including sodium acid pyrophosphate, sodium aluminum sulfate, sodium aluminum phosphate, dicalcium phosphate, monocalcium phosphate, citric acid, fumaric acid, tartaric acid, gluconic acid, glucono-delta lactone, and the like. Since the improved mixes of the present invention require only a very limited amount of easy mixing (i.e., stirring), it is preferred to use a somewhat larger amount of the leavening agents than is ordinarily used in prepared mixes. Additionally, it is preferred that at least a portion of the acid ingredient is of the fast-acting type, such as monocalcium phosphate monohydrate.

The liquid shortening may be any animal, vegetable or synthetic oil containing glycerides of fatty acids, which is liquid at ordinary room temperatures. Representative of such liquid shortenings are coconut oil, palm kernel oil, cottonseed oil, peanut oil, olive oil, sunflower seed oil, sesame oil, corn oil, safflower oil, poppyseed oil, soybean oil, and the like. Other naturally occurring fatty oils may be used as well as oils synthesized from various natural and synthetic fatty acids. All that is necessary is that said oils be edible and liquid at temperatures below about 80° F. As a practical matter, vegetable oils will generally be used because of their ready availability. It is preferred to employ cottonseed, peanut, sunflower seed, corn, soybean and safflower oils because all of these are commercially available in the form of bland, neutral products, which do not readily deteriorate in flavor.

The culinary mixes of this invention also include an emulsifier. Representative of such compounds are mono- and diglycerides of fat forming fatty acids, such as mono- and diolein, monostearin, and dipalmitin; polyoxyethylene ethers of fatty esters of polyhydric alcohols, such as the polyoxyethylene ethers of sorbitan monostearate or the polyoxyethylene ethers of sorbitan distearate; and partial esters of carboxylic acids such as lactic, citric, and tartaric acids with the mono- and diglycerides of fatty acids, such as glyceryl lactopalmitate and stearyl monoglyceridyl citrate. It is preferred to use these latter partial esters and outstanding results are obtained by using an emulsifier comprising a combination of glyceryl lactopalmitate and stearyl monoglyceridyl citrate. The fatty acids used to prepare the above emulsifiers include those derived from beef tallow and castor, coconut, cottonseed, mustard seed, palm, peanut, rapeseed, rice bran, soybean, and marine oils.

The mixes of our invention also include a small amount of a polygalactomannan. The polygalactomannans are polysaccharides composed principally of galactose and mannose units and are usually found in the endosperm of leguminous seeds, such as guar, locust bean, honey locust, flame tree, and the like. Guar flour, for example, is composed mostly of a galactomannan which is essentially a straight chain mannan with single membered galactose branches. The mannose units are linked in a 1-4$\beta$-glycosidic linkage and the galactose branching takes place by means of a 1–6 linkage on alternate mannose units. The ratio of galactose to mannose in the guar polymer is, therefore, one to two. Locust bean gum is also a polygalactomannan gum of similar molecular structure in which the ratio of galactose to mannose is one to four. Guar and locus bean gum are the preferred sources of the polygalactomannans, principally because of the commercial availability thereof.

As indicated above, the mixes may also contain albumen in the form of dried egg whites, dried egg yolks, salt, flavoring agents, artificial colorants, non-fat milk solids, lecithin, pregelatinized corn starch, and the like. Cocoa, various spices and vanilla are representative of the flavoring agents. Lecithin may conveniently be used in the form of a premix with non-fat milk solids.

It is obvious that a wide variety of culinary mixes can be produced according to this invention from the above-described ingredients. The amounts of the various ingredients will vary considerably depending on the type of mix to be prepared. The ingredients are generally used in the following ranges for brownie mixes, biscuit mixes, pancake mixes and cake mixes.

BROWNIE MIX

| Ingredients: | Percent by weight |
|---|---|
| Flour | 20.0 –30.0 |
| Sugar | 40.0 –60.0 |
| Liquid shortening | 7.0 –20.0 |
| Emulsifier | 0.25– 5.0 |
| Leavening agents | 0.20– 0.40 |
| Polygalactomannan | 0.05– 1.0 |
| Cocoa | 7.5 –15.0 |
| Salt | 0.0 – 1.0 |
| Non-fat milk solids | 0.0 – 5.0 |

BISCUIT MIX

| Ingredients: | Percent by weight |
|---|---|
| Flour | 65.0 –80.0 |
| Sugar | 1.0 – 5.0 |
| Liquid shortening | 10.0 –20.0 |
| Emulsifier | 0.25–10.0 |
| Leavening agents | 0.50– 4.0 |
| Polygalactomannan | 0.05– 1.0 |
| Salt | 0.0 – 3.0 |
| Non-fat milk solids | 0.0 – 5.0 |

PANCAKE MIX

| Ingredients: | Percent by weight |
|---|---|
| Flour | 50.0 –85.0 |
| Sugar | 3.0 –10.0 |
| Liquid shortening | 3.0 –10.0 |
| Emulsifier | 0.25– 5.0 |
| Leavening agents | 1.0 – 5.0 |
| Polygalactomannan | 0.05– 1.0 |
| Salt | 0.0 – 3.0 |
| Non-fat milk solids | 0.0 – 7.0 |
| Soy-protein | 0.0 – 5.0 |

CAKE MIXES

| Ingredients: | Percent by weight |
|---|---|
| Flour | 30.0 –50.0 |
| Sugar | 35.0 –60.0 |
| Liquid shortening | 1.0 –15.0 |
| Emulsifier | 0.25–10.0 |
| Leavening agents | 0.25– 4.0 |
| Polygalactomannan | 0.05– 1.0 |
| Albumen | 0.0 – 5.0 |
| Salt | 0.0 – 1.5 |
| Lecithin | 0.0 – 1.5 |
| Non-fat milk solids | 0.0 – 5.0 |
| Flavoring agents | 0.0 –10.0 |

Preferred ranges for the ingredients of cake mixes are as follows.

| Ingredients: | Percent by weight |
|---|---|
| Flour | 30.0 –45.0 |
| Sugar | 40.0 –55.0 |
| Liquid shortening | 1.0 –10.0 |
| Emulsifier | 0.5 – 5.0 |
| Polygalactomannan | 0.1 – 0.5 |
| Sodium bicarbonate | 0.75– 1.5 |
| Dicalcium phosphate | 0.50– 2.0 |
| Anhydrous monocalcium phosphate | 0.20– 0.50 |
| Monocalcium phosphate monohydrate | 0.20– 0.75 |
| Albumen | 0.00– 2.00 |
| Salt | 0.50– 0.80 |
| Lecithin | 0.50– 1.00 |
| Non-fat milk solids | 1.00– 4.0 |
| Flavoring agents | 0.20– 8.00 |

As indicated previously, the ingredients are combined by conventional procedures. Thus, a pre-mix of all of the dry ingredients is prepared and then the liquid shortening and other liquid ingredients are blended therewith using a high speed ribbon blender. The resulting dry, free-flowing mix may then be packaged and distributed through commercial channels.

Batters are prepared from the culinary mixes of the present invention by placing the dry mix ingredients in a suitable container such as a mixing bowl (the mix may be placed directly in the baking pan in the case of cake mixes and the like), adding the required amount of aqueous liquid, and then the mix and aqueous liquid are stirred with a fork, spoon or the like until a relatively smooth batter is obtained. The stirring requires little effort and can be accomplished in a short time (for example, about 30–60 seconds) with relatively few strokes (for example, about 20–100). The batter is then ready for baking which, in the case of cake batters, can be carried out at temperatures of about 330°–370° F. for about 30–45 minutes.

When it is desired to prepare a layer cake from the mixes of our invention, the mix and aqueous liquid may be placed in a bowl, stirred with a fork or other like utensil and then poured into the two cake pans.

Alternatively, all of the ingredients (mix and aqueous liquid) may be placed in a large mixer bowl and blended at low speed for about 30 seconds and then at medium speed for a maximum period of about 45 seconds. The batter is then poured into the baking pan or pans.

The aqueous liquid comprises water and preferably also whole fresh eggs or either fresh egg whites or yolks. A particularly unexpected feature of the present invention is the discovery that hot water can be used in the batter preparation. The prior art mixes specify the use of cold water (since hot water had a deleterious effect on the action of leavening agents). We found that batters can be prepared from our mixes using hot water, i.e., temperature of about 120–212° F. and preferably about 140° F. which is the temperature of hot tap water. The hot water and fresh egg material can be added to the mix separately or at the same time. Fresh egg material also includes frozen whole eggs or the whites or yolks thereof.

To illustrate the application of the present invention to various mixes, the following detailed examples are set forth.

Example I

A devil's food cake mix was prepared from the following ingredients.

| Ingredients | Percent by weight |
|---|---|
| Cake flour | 31.41 |
| Sucrose (powdered) | 34.25 |
| Sucrose (granular) | 11.43 |
| Safflower oil | 5.35 |
| Atmos 300 [1] | 0.50 |
| Glyceryl lactopalmitate | 1.75 |
| Stearyl monoglyceridyl citrate | 0.30 |
| Guar flour | 0.50 |
| Cocoa | 7.00 |
| Non-fat milk solids | 2.00 |
| Sodium bicarbonate | 1.61 |
| Dicalcium phosphate | 0.75 |
| Anhydrous monocalcium phosphate | 0.21 |
| Monocalcium phosphate monohydrate | 0.50 |
| Sodium chloride | 0.60 |
| Vanilla | 0.30 |
| Lecithin (40% on non-fat milk solids) | 1.54 |

[1] Atmos 300 is an emulsifier available from Atlas Powder Co. of Wilmington, Delaware, and consists essentially of glyceryl mono- and dioleates (54–59% monoglyceride content).

The mix was prepared in the conventional manner described above. A batter was prepared from 19 ounces of the mix, 270 cc. of hot tap water (140° F.) and two whole fresh eggs. The mix was placed in a baking pan (9" x 13" x 2"), the water was added, and the mixture stirred for a few seconds using a fork as a rake. The eggs were then added and the stirring was continued until the eggs were well distributed and all of the mix was wetted. The batter was then beat gently with the fork for about one minute. The pan was placed in an oven at 350° F. for about 30 minutes. The resulting cake had the following properties: Crust—smooth; Texture—slightly open; height—30/16–32/16 in.; moistness—moist.

Example II

A yellow cake mix was prepared in the same manner as described above from the following ingredients.

| Ingredients | Percent by weight |
|---|---|
| Cake flour | 38.41 |
| Sucrose (powdered) | 34.25 |
| Sucrose (granular) | 11.43 |
| Safflower oil | 5.35 |
| Atmos 300 | 0.50 |
| Glyceryl lactopalmitate | 1.75 |
| Stearyl monoglyceridyl citrate | 0.30 |
| Guar flour | 0.50 |
| Non-fat milk solids | 2.00 |
| Sodium bicarbonate | 1.61 |
| Dicalcium phosphate | 0.75 |
| Anhydrous monocalcium phosphate | 0.21 |
| Monocalcium phosphate monohydrate | 0.50 |
| Sodium chloride | 0.60 |
| Vanilla | 0.30 |
| Lecithin (40% on non-fat milk solids) | 1.54 |

A batter was prepared in exactly the manner as set forth in Example I. The resulting cake had the following properties: Crust—smooth and slightly brown; texture—open but even; height—30/16–32/16 in.; moistness—moist.

The above examples clearly demonstrate the outstanding advantages of the mixes of the present invention. Thus, batters were prepared in an extremely simple manner in the baking pan and the resulting cakes had superior qualities. Cakes prepared from similar mixes and by similar procedures but which did not contain the guar gum had a lower volume and a fairly open and uneven texture.

It will be understood that, while the invention has been described in part by means of specific examples, reference should be had to the appended claims for a definition of the scope of the invention.

The embodiments of the invention in which an exclusive property or privilege is claimed are defined as follows:

1. A culinary mix useful for preparing baked goods comprising flour, sugar, leavening agent, liquid shortening, an emulsifier and a sufficient amount of a polygalactomannan to improve the volume and texture of the baked goods prepared from the culinary mix.

2. The mix of claim 1 wherein the polygalactomannan is guar gum.

3. The mix of claim 1 wherein the sugar is sucrose.

4. The mix of claim 1 wherein the liquid shortening is a vegetable oil.

5. The mix of claim 1 wherein the emulsifier comprises a combination of glyceryl lactopalmitate and stearyl monoglyceridyl citrate.

6. A cake mix comprising 30.0–50.0 percent flour, 35.0–60.0 percent sugar, 1.0–15.0 percent liquid shortening, 0.50–4.0 percent leavening agent, 0.05–1.0 percent polygalactomannan, and 0.25–10.0 percent emulsifier.

7. The mix of claim 6 wherein the polygalactomannan is guar gum.

8. The mix of claim 6 which also contains 0.0–1.5 percent salt, 0.0–1.5 percent lecithin, 0.0–5.0 percent nonfat milk solids and 0.0–10.0 percent flavoring agents.

9. The mix of claim 6 wherein the liquid shortening is a vegetable oil.

10. The mix of claim 9 wherein the vegetable oil is selected from the group consisting of corn oil, safflower oil, cottonseed oil, peanut oil, soybean oil, and sunflower seed oil.

11. The mix of claim 6 wherein the leavening agent is a mixture of sodium bicarbonate, dicalcium phosphate, anhydrous monocalcium phosphate and monocalcium phosphate monohydrate.

12. The mix of claim 6 wherein the emulsifier comprises a combination of glyceryl lactopalmitate and stearyl monoglyceridyl citrate.

13. The process of preparing a batter suitable for the preparation of baked goods which comprises stirring a mix comprising flour, sugar, leavening agent, liquid shortening, an emulsifier and a sufficient amount of a polygalactomannan to improve the volume and texture of the baked goods prepared from the batter with hot water and fresh egg material for a sufficient length of time to wet substantially all of the mix with the aqueous liquid.

References Cited in the file of this patent

UNITED STATES PATENTS

| | | |
|---|---|---|
| 2,821,479 | Forkner | Jan. 28, 1958 |
| 2,874,051 | Bedenk et al. | Feb. 17, 1959 |
| 2,874,053 | Mills | Feb. 17, 1959 |
| 2,918,377 | Hurley et al. | Dec. 22, 1959 |
| 2,954,297 | Elsesser et al. | Sept. 27, 1960 |
| 3,037,864 | Bedenk | June 5, 1962 |
| 3,071,472 | Hager et al. | Jan. 1, 1963 | ize
UNITED STATES PATENT OFFICE
CERTIFICATE OF CORRECTION

Patent No. 3,161,524

December 15, 1964

Joseph W. Opie et al.

It is hereby certified that error appears in the above numbered patent requiring correction and that the said Letters Patent should read as corrected below.

Column 5, line 7, for "0.25-4.0" read -- 0.50-4.0 --.

Signed and sealed this 27th day of April 1965.

(SEAL)
Attest:

ERNEST W. SWIDER
Attesting Officer

EDWARD J. BRENNER
Commissioner of Patents